July 17, 1956　　　M. L. EARSLEY　　　2,754,522
BALL VALVE FOR FLUSH TANKS
Filed Aug. 31, 1953　　　2 Sheets-Sheet 1
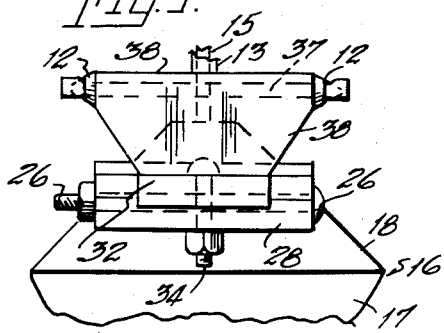
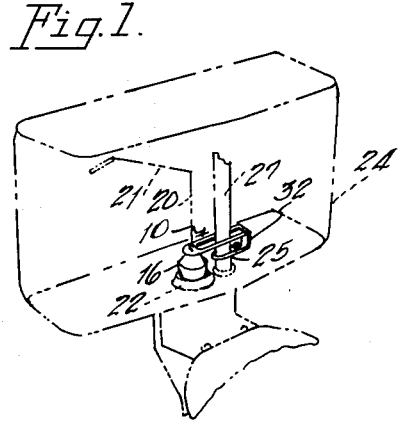
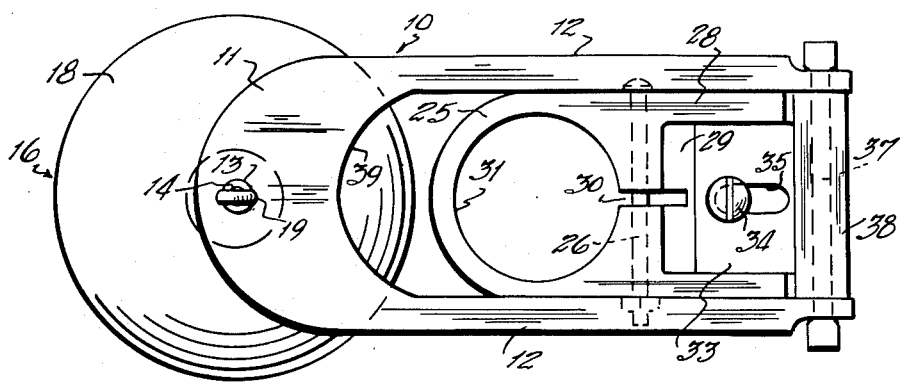
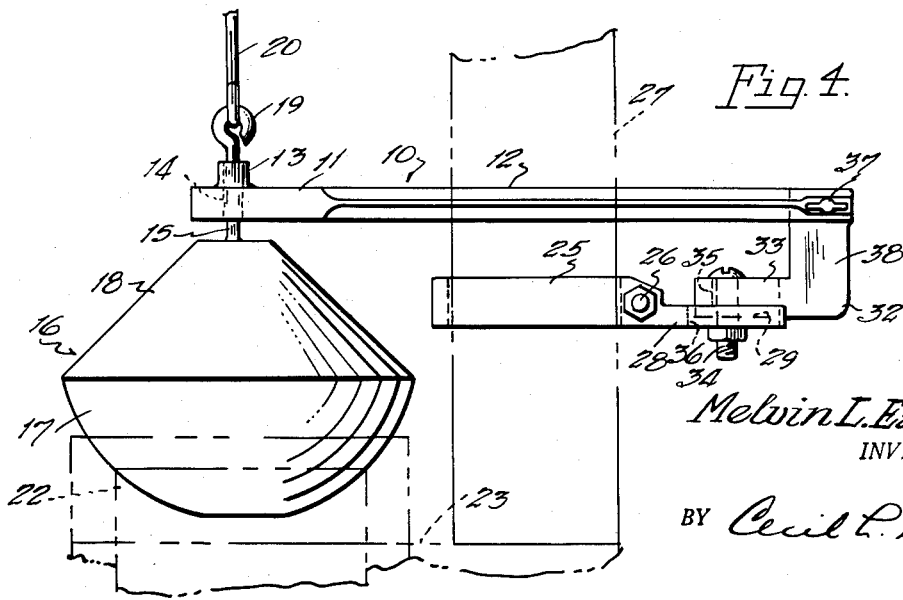
Melvin L. Earsley
INVENTOR.
BY
ATTORNEY July 17, 1956  M. L. EARSLEY  2,754,522
BALL VALVE FOR FLUSH TANKS
Filed Aug. 31, 1953  2 Sheets-Sheet 2

Melvin L. Earsley
INVENTOR.

BY Cecil L. Wood
ATTORNEY ed States Patent Office 2,754,522
Patented July 17, 1956

2,754,522
BALL VALVE FOR FLUSH TANKS
Melvin L. Earsley, Lubbock, Tex.
Application August 31, 1953, Serial No. 377,288
4 Claims. (Cl. 4—57)

This invention relates to ball valves for commode flush tanks, and the like, and it has particular reference to a ball closure for the water outlet in a flush tank, and its principal object resides in the provision of a novel ball supporting mechanism by which a more positive seating of the valve is insured to prevent leakage, and by reason of the unique leverage arrangement, the ball is practically incapable of sticking or hanging in unseated positions.

Another object of the invention is that of providing a mechanism which can readily be formed of non-corrosive materials, such as plastics, and made completely adjustable so that installation in all types or makes of commode tanks is easily accomplished, even by unskilled persons, and the closure ball can be centered so as to be firmly and positively seated.

A further object of the invention is manifest in the provision of a leverage assembly for guiding the ball to its seat which can be installed in relatively close relationship to the seat and thus avoid the difficulties encountered in conventional apparatus in guiding the ball to its seat through a long stem and the usual rigid stem guide which, when it becomes worn or misshapen, hampers the movement of the stem therethrough and often fails to properly seat the valve.

A still further object of the invention resides in the provision of a ball supporting device which can be formed with a plurality of receptacles in its upper face capable of retaining quantities of water by which added weight can be applied in effecting a more positive action in directing the closure valve back to its seat.

Broadly, the invention contemplates the provision of a flexible guide for a ball valve designed for installation near the valve whereby lateral movement of the valve stem in operation is minimized so that the valve is maintained centrally of the seat at all times and, through the limited movement of the stem guide, the ball is directed to a positive seated position to close the outlet.

While the foregoing objects are paramount, other and lesser objects will become manifest as the description proceeds, taken in connection with the appended drawings wherein:

Figure 1 is a perspective illustration of the invention installed in a commode flush tank, the latter being shown in broken lines.

Figure 2 is a plan view of the guide yoke and clamp members, the ball valve and the adjustable connecting bracket for the guide yoke and clamp.

Figure 3 is a rear elevational view of the guide yoke, supporting clamp and adjustable connecting bracket, the ball being fragmentarily shown.

Figure 4 is a side elevational view of the hinged guide yoke, the supporting clamp and adjustable bracket, and illustrating the ball and stem, the seat and overflow tube being shown in broken lines.

Figure 5:
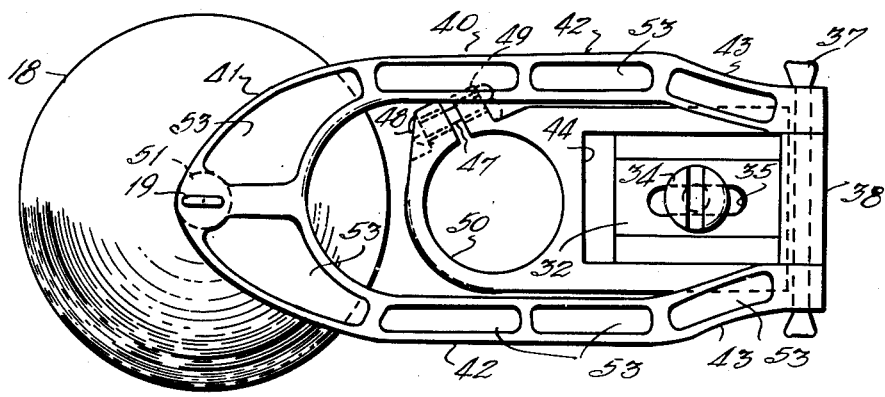
Figure 5 is a plan view of a modified form of the guide yoke and clamp in which a plurality of receptacles are formed in the upper face of the guide yoke.

The invention is designed to be installed in any conventional commode flush tank and to be used with the common type of flushing mechanisms, including a float controlled inlet valve and an overflow tube. The invention is designed to be attached to and supported by an overflow tube in the flush tank but may obviously be supported on a wall of the tank, or may be secured to a bracket formed with or attached to the valve seat and overflow tube casting in the bottom of the tank.

Accordingly, the invention comprises a valve stem guide or yoke 10 which is substantially U-shaped, as apparent in Figure 2, being formed with a semi-circular body 11 having a bifurcation providing a pair of spaced legs 12. In the body 11, and on the longitudinal axis of the member 10, is an annular boss 13 through which is formed a passage 14 slidably embracing the stem 15 of a ball closure 16, of conventional design, having a bulbous seating portion 17 and a conical top 18, as illustrated in Figure 4.

The valve stem 15 is relatively short and has a loop 19 formed at its upper end to which is attached a preferably flexible coupling, such as a chain 20, whose upper end is attached to the valve operating lever 21, shown in broken lines in Figure 1. The ball 16 is normally seated on the outlet seat 22 in the bottom 23 of the tank 24. A clamp 25 is secured by a screw or bolt 26 about the overflow tube 27, shown in broken lines in Figures 1 and 4, and is spaced above the bottom 23 of the tank 24, and has an extended portion 28 in which is formed a rectangular recess 29 in its upper surface. A slit 30 is provided in the clamp 25 and extends from the circular opening 31 therein into the recess 29 as shown in Figure 2, whereby tension can be applied to the clamp 25 through the bolt 26 which is arranged transversely through the clamp 25 across the slit 30.

An L-shaped bracket 32 is secured to the extended portion 28 of the clamp 25, its horizontal leg 33 reposing in the rectangular recess 29, by a bolt 34 arranged through a slot 35 in the extended portion 28 of the clamp 25 and a corresponding slot 36 in the leg 33 of the bracket 32, such arrangement providing for the adjustment of the bracket 32 toward and away from the overflow tube 27, as desired.

The legs 12 of the guide yoke 10 extend on each side of the overflow tube 27 and their extremities are pivotally attached by a pin 37 to each side of the vertical leg 38 of the bracket 32, the pin 37 extending all the way through the member 38, as shown in Figures 2 and 3. The width of the vertical leg 38 of the bracket 32 is substantially greater at its top than the horizontal leg 33, the sides being angular, as shown in Figure 3.

It will be observed, by reference to Figure 4, that the guide yoke 10 assumes a horizontal position when the ball 16 is seated and remains in this position until the flush lever is actuated to raise the ball 16 sufficiently to cause the inner edge 39 of the body 11 of the guide yoke 10 to engage the overflow tube 27. The ball 16 will remain in this elevated position until the water level in the tank is reduced to approximately that of the ball 16 when the latter will drop with the water level to its seat 22. The stem 15 is only of sufficient length to permit of a limited vertical movement of the ball 16 independently of the guide yoke 10, as indicated in Figure 4, to insure proper seating of the ball 16.

The relatively long rods usually employed for raising the ball from its seat generally permits of excessive lateral movement thereof so that its seating is haphazard in comparison to the operation of the instant device, although it is obvious that with the guide yoke 10 a longer stem or actuating rod can be employed with good results if the guide yoke 10 is adjusted along the overflow tube 27 so as to be relatively close to the ball 16, or spaced only slightly thereabove so that only a relatively slight upward movement of the ball 16 will cause the guide yoke to move and, by such movement, retain the ball 16, through its stem 15, in proper alignment with the seat 22. It is also desirable that the passage 14 be of such dimension as to permit a free movement of the stem 15 therein.

Figure 6:
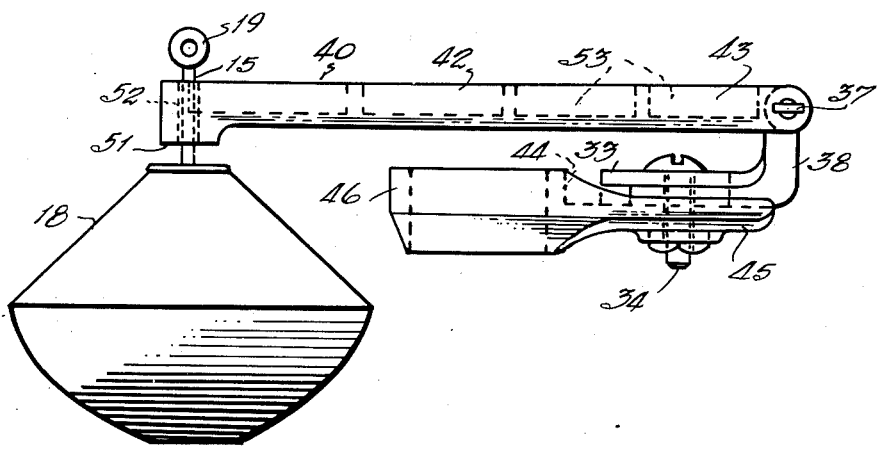
Figure 6 is a side elevational view of the device illustrated in Figure 5

In Figures 5 and 6 is illustrated a modification of the structure shown in Figures 1, 2, 3 and 4 and embodies a yoke member 40 which is also substantially U-shaped but whose body portion 41 is ovalescent and its legs 42 have converging portions 43 at their ends where these members are pivoted to the vertical leg 38 of the bracket 32 by the pin 37, as shown in Figure 1. The bracket 32 has its horizontal leg 33 slidably secured by the screw 34 in a rectangular recess 44 formed in the upper face of the extended portion 45 of a clamp 46 which latter has an adjusting screw 47 operating through a pair of lugs 48 and 49 on one side of the circular opening 50 thereof by which it is secured to the overflow pipe 27 of the flush tank 24, as shown in Figure 5.

The forward end of the body portion 41 has a circular boss 51 formed therebeneath having a bore 52 therethrough which also extends through the member 41 to slidably receive the stem 15 of the ball 16 and which is of sufficient dimension to permit of free sliding movement of the latter.

The upper surface of the yoke member 40 has a plurality of receptacles or recesses 53 formed therein to receive and retain quantities of water which will add weight to the member 40 to expedite the closing of the ball 16 against its seat.

Manifestly, certain changes in design and modifications in structure may be resorted to from time to time, by persons skilled in the art, without departing from the spirit of the invention or the scope of the appended claims.

What is claimed is:

1. In a ball valve for commode flush tanks having a water outlet opening and an overflow tube, a ball closure for said outlet opening having a stem, a U-shape yoke having a semi-circular body portion slidably attached to said stem and having its legs embracing said overflow tube, a clamp adjustably secured to said overflow tube and formed with an extended portion opposite said body portion of said yoke, a bracket arranged on the said extended portion and adjustable with respect to said tube, the legs of said yoke being hinged to said bracket.

2. In a ball valve for commode flush tanks having a water outlet and an overflow tube, a ball closure for said water outlet having a stem, a yoke member having a body and parallel spaced leg portions, the said body having a slidable connection with said stem and said leg portions extending on opposite sides of said overflow tube, a clamp adjustably arranged on said tube and having a portion formed therewith projecting therefrom opposite said ball, and a bracket secured to said clamp and capable of fixed adjustments thereon with respect to said overflow tube and hingedly supporting said leg portions.

3. In a ball valve for commode tanks having a water outlet and an overflow tube near said outlet, a ball closure for said outlet having a stem, a yoke member providing a lever for operating said ball closure, the said yoke member having a body portion and parallel spaced leg portions and recesses formed therein, the said body portion being slidably connected to said stem and said leg portions extending on each side of said overflow tube opposite said ball, a clamp adjustably secured to said overflow tube, and a bracket formed with said clamp hingedly supporting the leg portions of said yoke member.

4. In a ball valve for commode flush tanks having a water outlet and an overflow tube, a ball valve seated in said outlet and having an operating stem, a bifurcated yoke member formed with a body and spaced parallel legs and having receptacles formed therein, the said body having a sliding connection with said stem and the said legs embracing said tube, a clamp adjustably secured to said tube and having a projected portion formed thereon opposite said ball, and a bracket secured to said clamp and adapted to be adjusted with respect to said tube and hingedly supporting the legs of said yoke.

References Cited in the file of this patent

UNITED STATES PATENTS

| | | |
|---|---|---|
| 1,201,416 | Ziemer | Oct. 17, 1916 |
| 2,142,393 | Halteman | Jan. 3, 1939 |
| 2,526,294 | Stegeman | Oct. 17, 1950 |
| 2,598,967 | Bennett | June 3, 1952 |
| 2,602,933 | Curry | July 15, 1952 |